US010239032B2

(12) United States Patent
Takigawa et al.

(10) Patent No.: US 10,239,032 B2
(45) Date of Patent: Mar. 26, 2019

(54) UNIT FOR CHLORINE DIOXIDE GENERATION AND CHLORINE DIOXIDE GENERATION DEVICE

(71) Applicant: TAIKO PHARMACEUTICAL CO., LTD., Osaka (JP)

(72) Inventors: Yasuhiro Takigawa, Osaka (JP); Koichi Nakahara, Osaka (JP); Daisuke Kato, Osaka (JP); Kazuhiko Taguchi, Osaka (JP); Kazuki Matsubara, Osaka (JP); Koshiro Sogawa, Osaka (JP); Kouichi Taura, Osaka (JP); Miyusse Sakasegawa, Osaka (JP)

(73) Assignee: Taiko Pharmaceutical Co., Ltd., Osaka (JP)

( * ) Notice: Subject to any disclaimer, the term of this patent is extended or adjusted under 35 U.S.C. 154(b) by 60 days.

(21) Appl. No.: 15/106,704

(22) PCT Filed: Dec. 19, 2014

(86) PCT No.: PCT/JP2014/083670
§ 371 (c)(1),
(2) Date: Jun. 20, 2016

(87) PCT Pub. No.: WO2015/098732
PCT Pub. Date: Jul. 2, 2015

(65) Prior Publication Data
US 2017/0028371 A1 Feb. 2, 2017

(30) Foreign Application Priority Data

Dec. 27, 2013 (JP) .................................. 2013-271125
Nov. 6, 2014 (JP) .................................. 2014-225833

(51) Int. Cl.
*B01J 7/00* (2006.01)
*C01B 11/02* (2006.01)
(Continued)

(52) U.S. Cl.
CPC ............... *B01J 7/00* (2013.01); *B01J 19/123* (2013.01); *B01J 19/127* (2013.01); *B01J 21/063* (2013.01);
(Continued)

(58) Field of Classification Search
CPC . B01J 7/00; B01J 19/123; B01J 19/127; B01J 35/004; B01J 21/063;
(Continued)

(56) References Cited

U.S. PATENT DOCUMENTS 8,652,411 B2 *  2/2014  Taguchi ................. A61L 9/015
                                                        422/186.3
2008/0026029 A1 * 1/2008  Wellinghoff ............. A01N 3/02
                                                        424/408

FOREIGN PATENT DOCUMENTS

JP      2002-543977      12/2002
JP      2005-224386       8/2005
(Continued)

OTHER PUBLICATIONS

English Translation of the International Search Report corresponding to International Patent Application No. PCT/JP2014/083670 (2 pages) (dated Mar. 17, 2015).

*Primary Examiner* — Timothy C Cleveland
(74) *Attorney, Agent, or Firm* — Myers Bigel, P.A.

(57) ABSTRACT

The present invention provides a chlorine dioxide generation unit that can release practically sufficient amount of chlorine dioxide for an extended period of time while being compact. The present invention provides a chlorine dioxide generation unit, characterized in that said unit comprises an agent storage space portion and at least two light source portions, said light source portion is for generating light consisting of wavelengths substantially in the visible region, said agent storage space portion stores an agent comprising solid chlorite, and said agent storage space portion comprises one
(Continued)

or more openings so that air could move in and out of said agent storage space portion, wherein chlorine dioxide gas is generated by irradiating said light generated from said light source portion onto said agent present inside said agent storage space portion.

20 Claims, 15 Drawing Sheets

(51) Int. Cl.
*B01J 19/12* (2006.01)
*B01J 21/06* (2006.01)
*B01J 35/00* (2006.01)

(52) U.S. Cl.
CPC ............ *B01J 35/004* (2013.01); *C01B 11/024* (2013.01); *B01J 2219/0879* (2013.01); *B01J 2219/0892* (2013.01); *B01J 2219/1203* (2013.01)

(58) Field of Classification Search
CPC ........ B01J 2219/1203; B01J 2219/0879; B01J 2219/0892; C01B 11/024
See application file for complete search history.

(56) References Cited

FOREIGN PATENT DOCUMENTS

| JP | 2011-067285 | 4/2011 |
| JP | 2012-111673 | 6/2012 |
| WO | WO 00/69775 A1 | 11/2000 |
| WO | WO 2011/118447 A1 | 9/2011 |

* cited by examiner

[Figure 1]
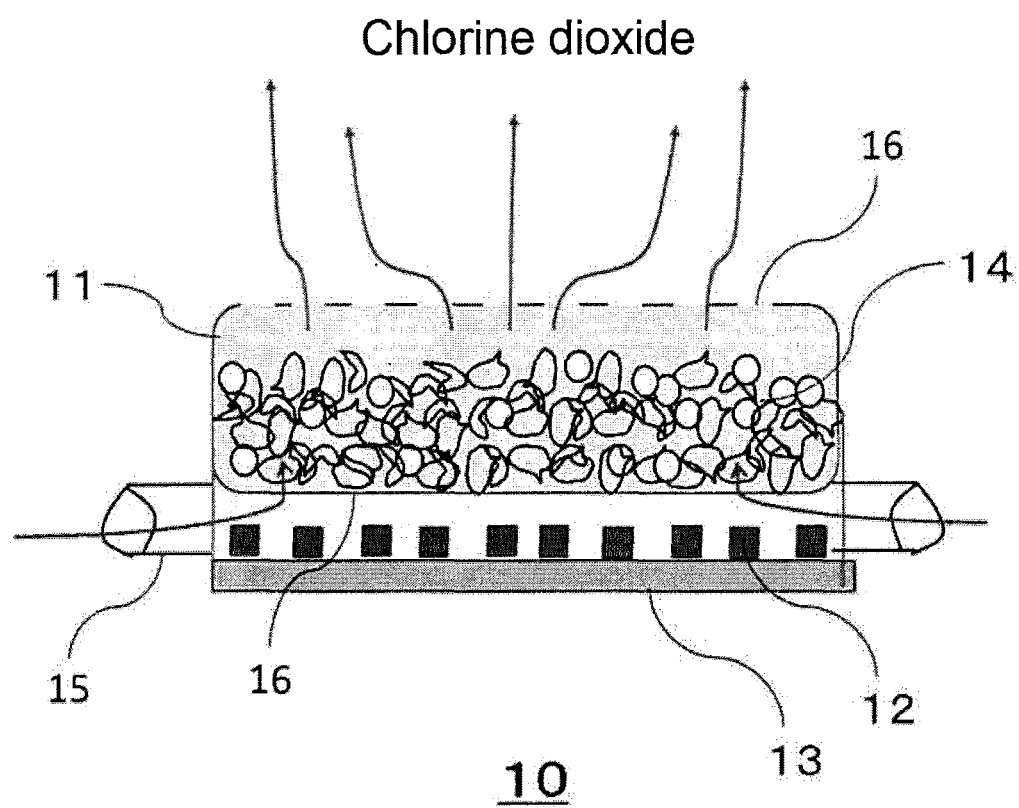

[Figure 2]
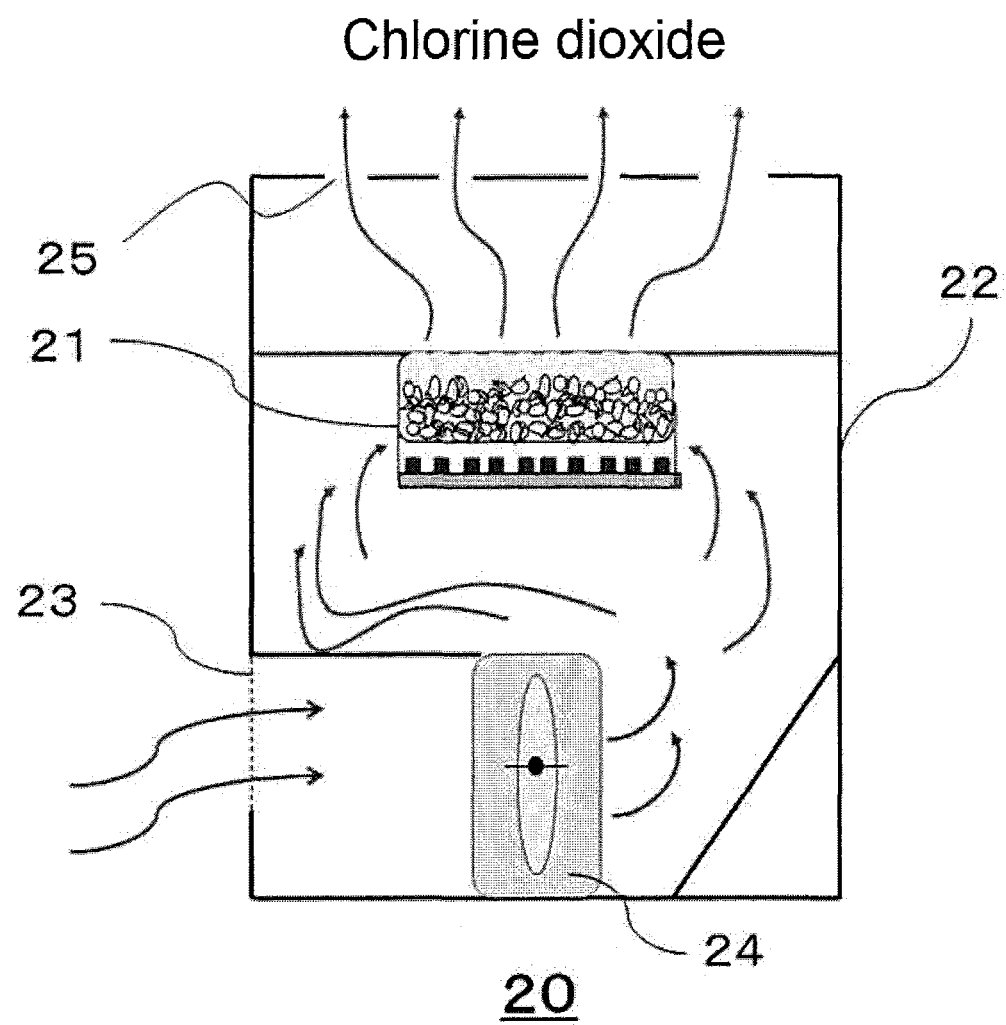

[Figure 3]
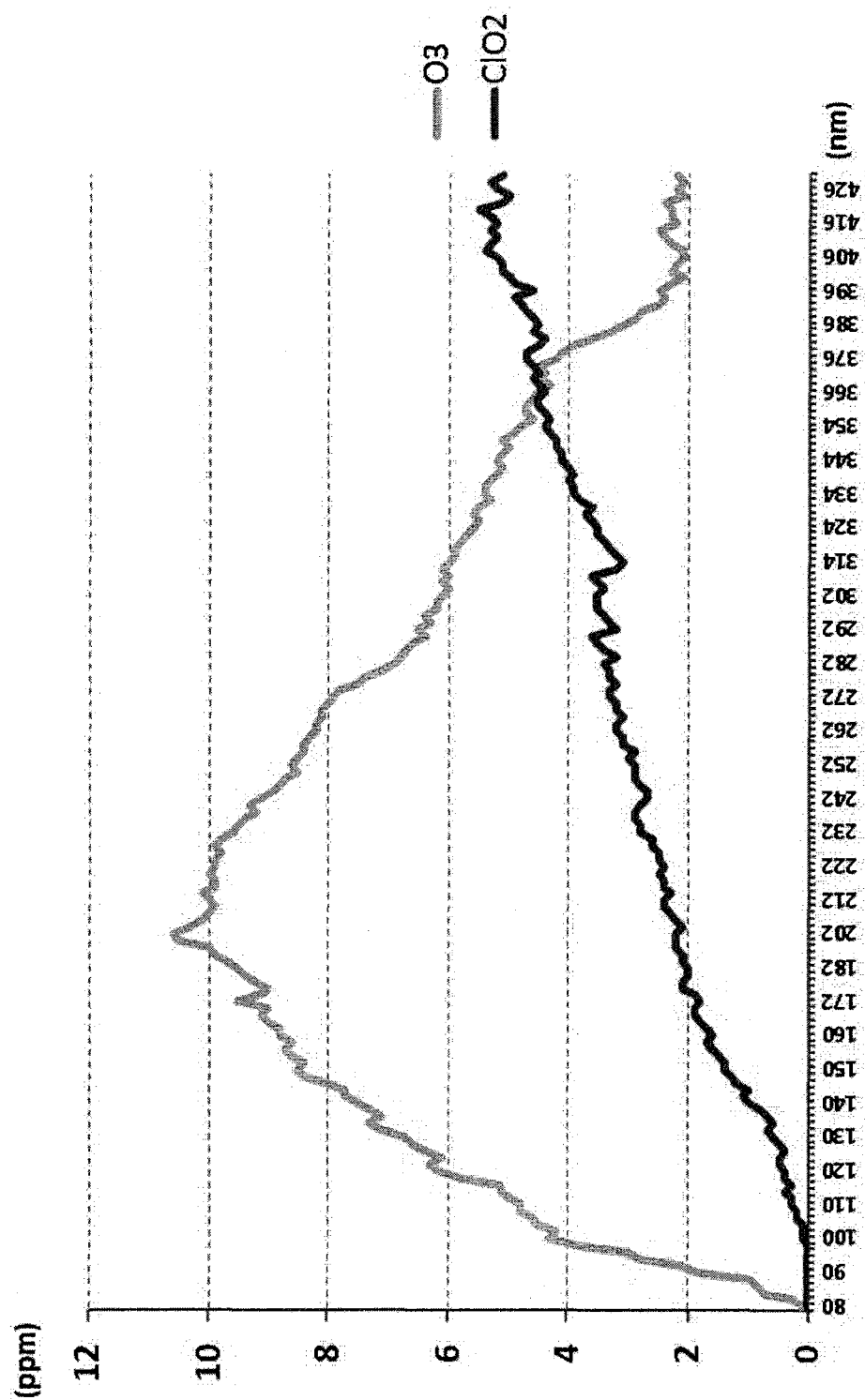

[Figure 4]
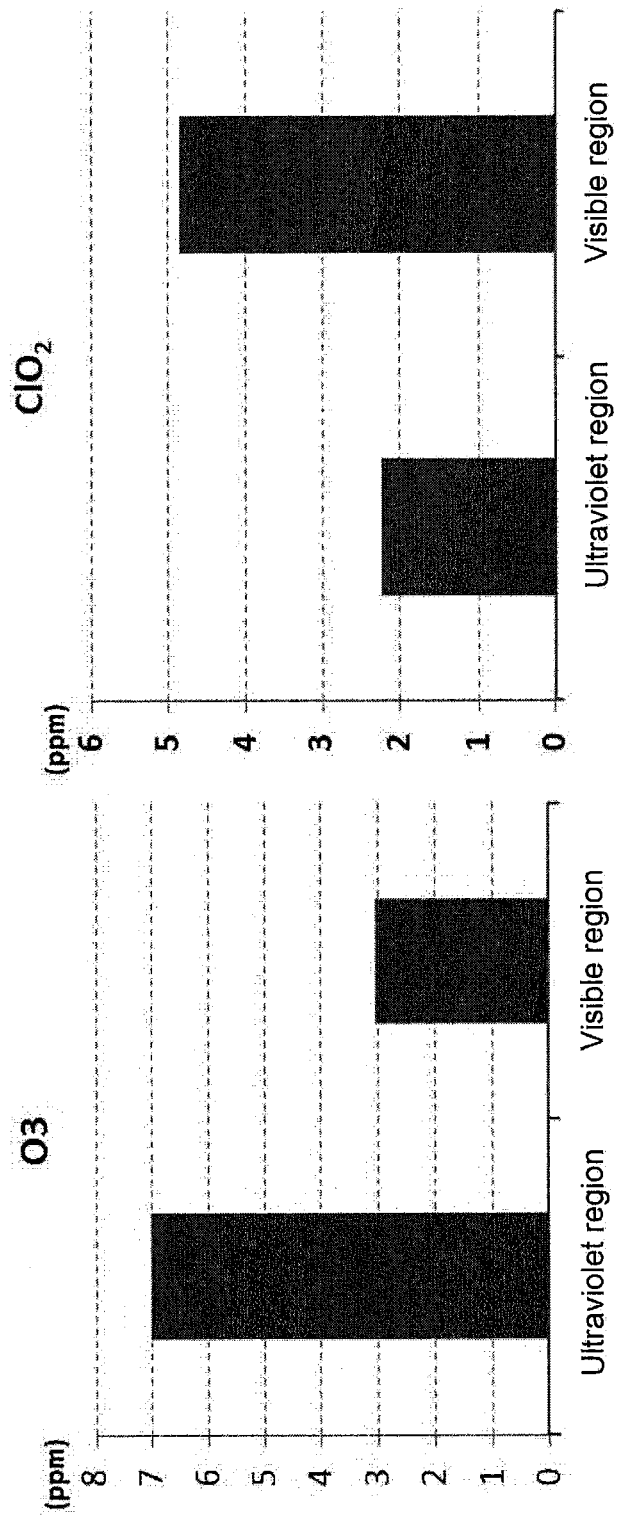

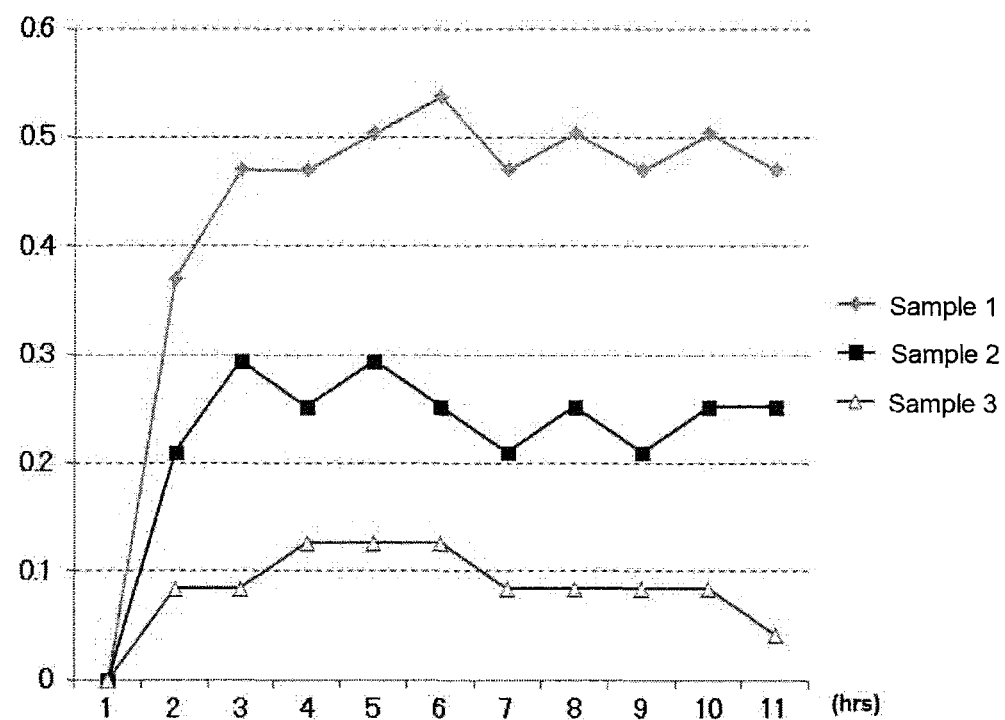
[Figure 5]

[Figure 6]
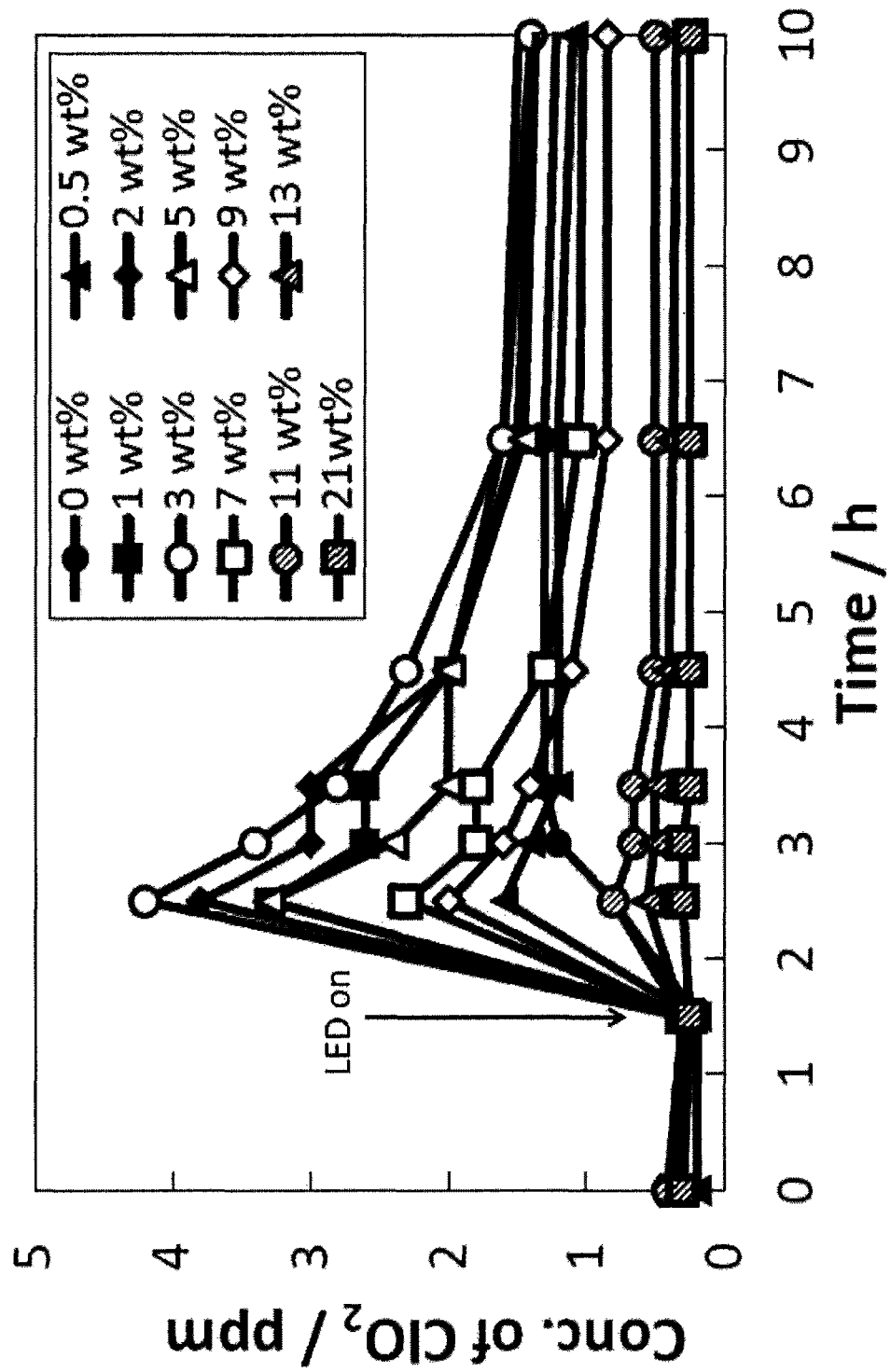

[Figure 7]
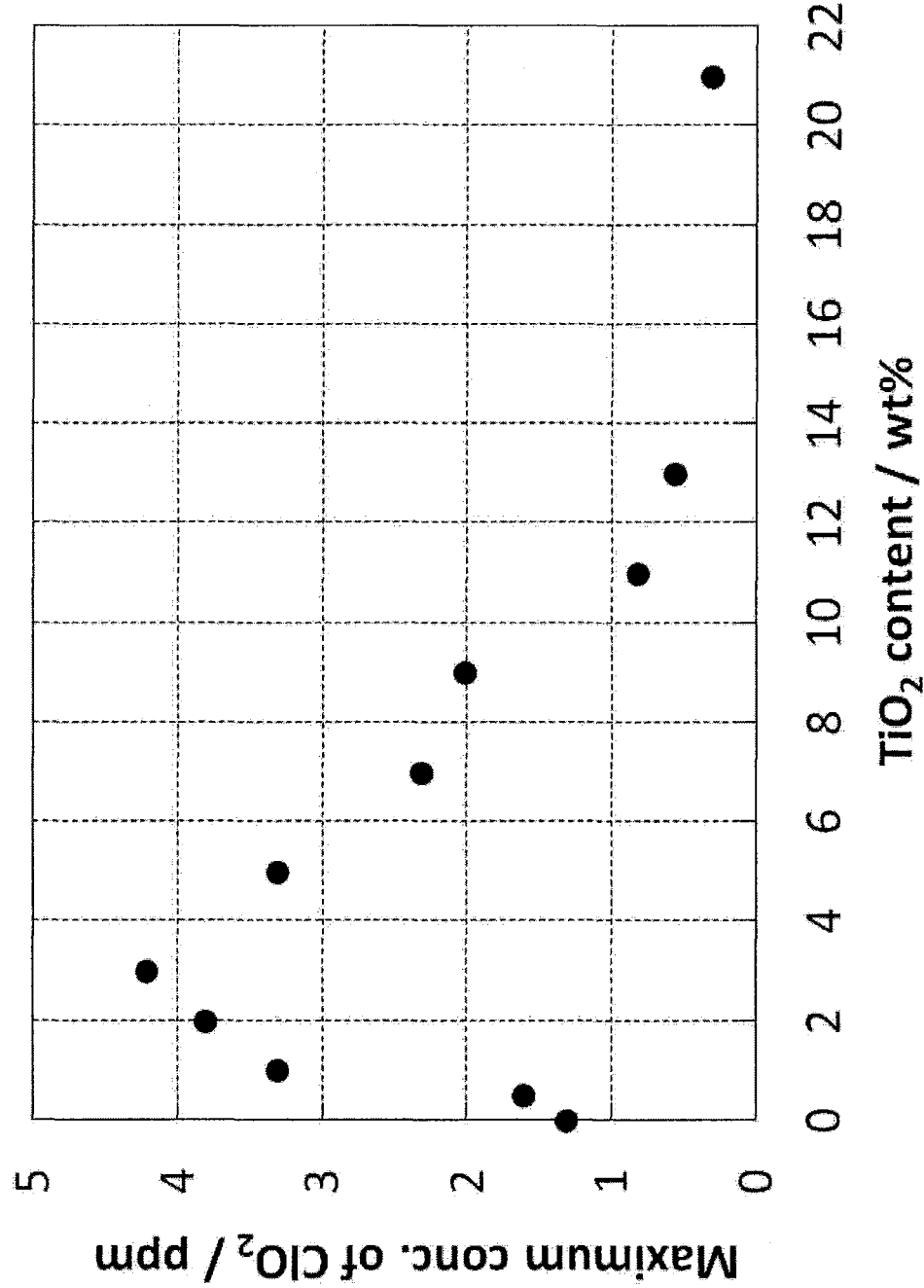

[Figure 8]
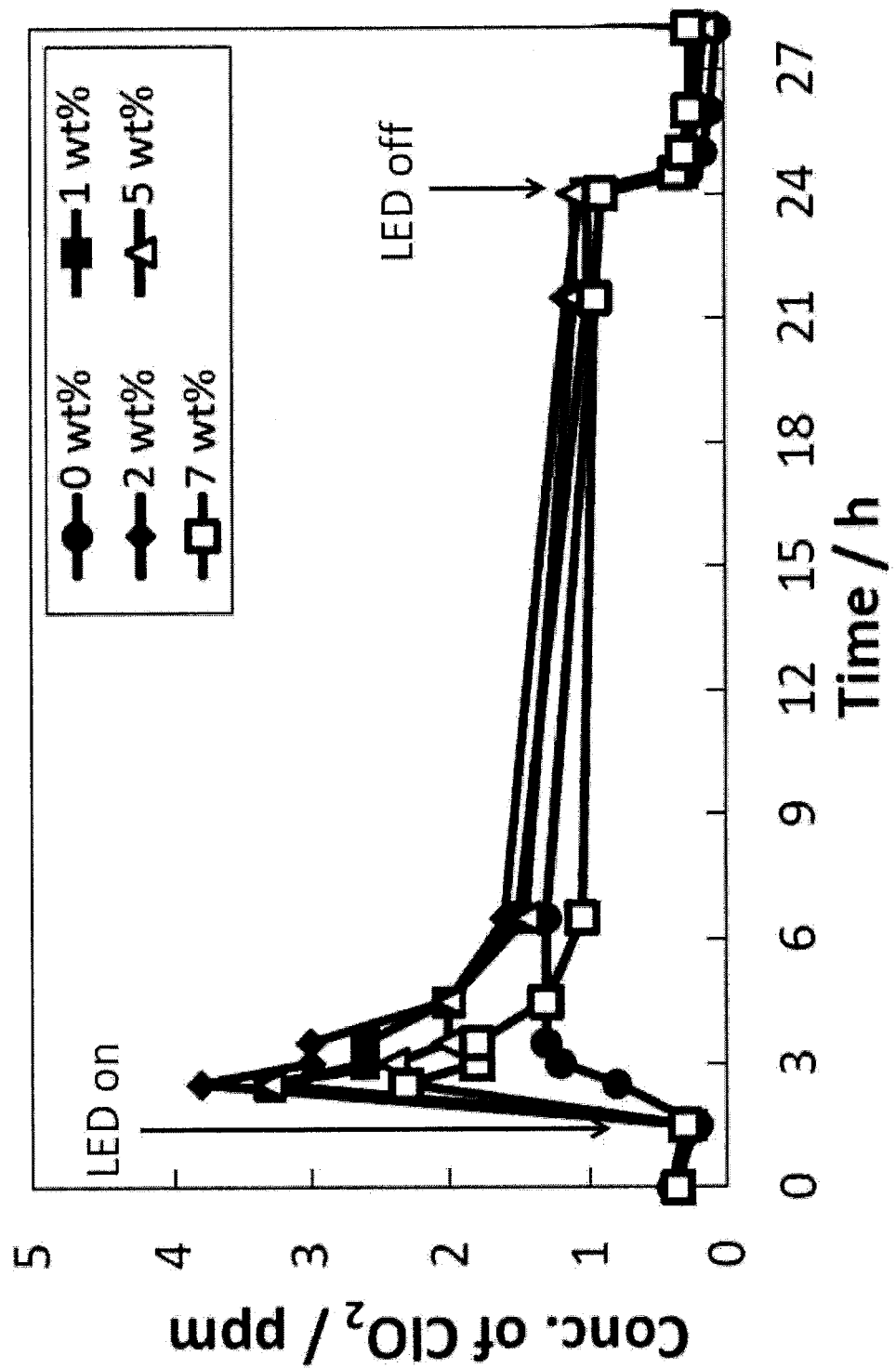

[Figure 9]
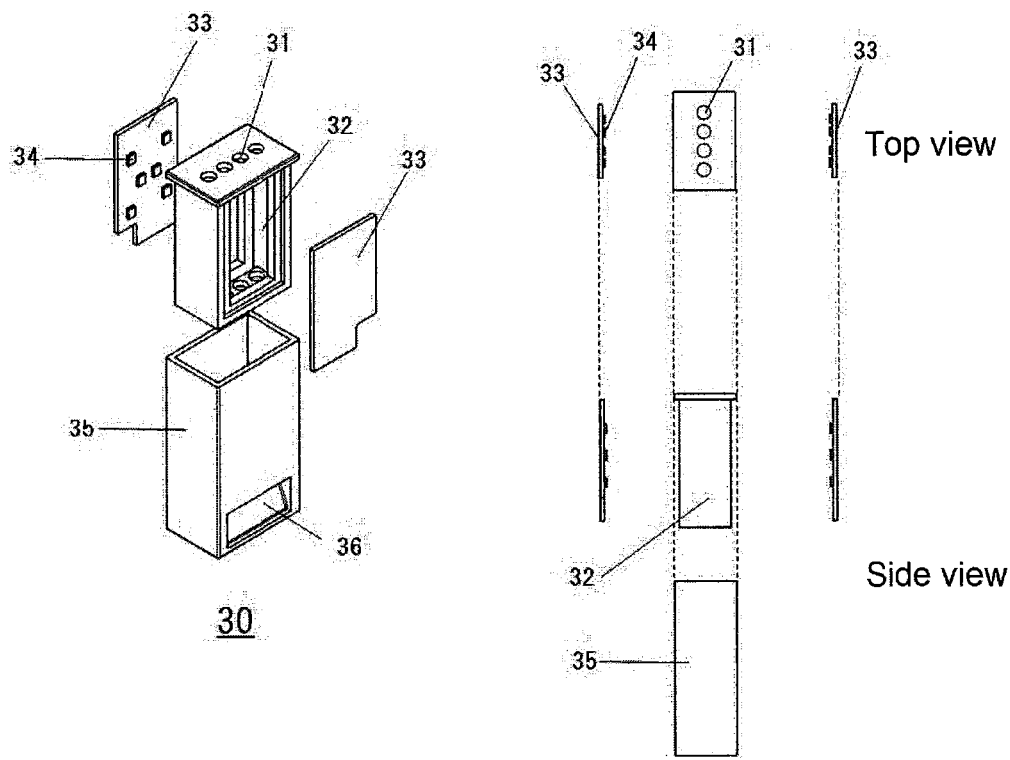

[Figure 10]
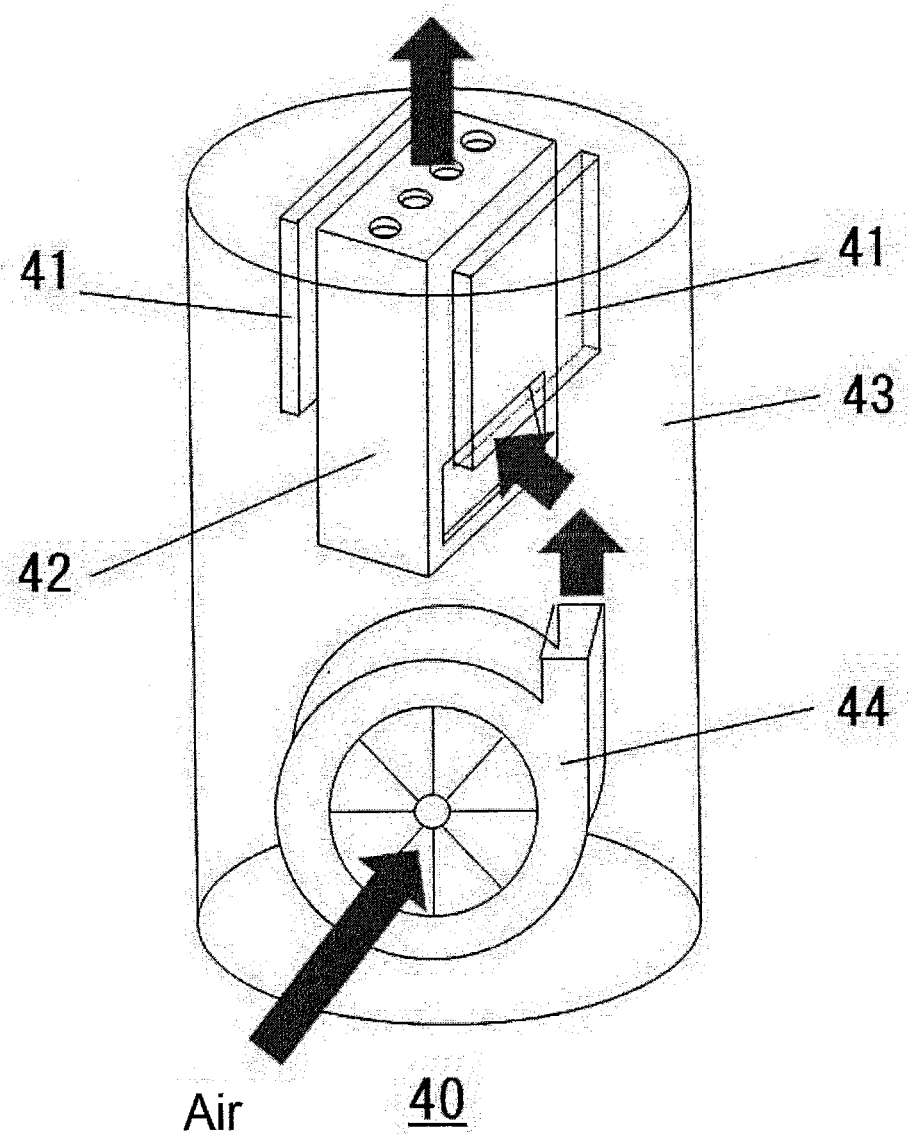

[Figure 11]
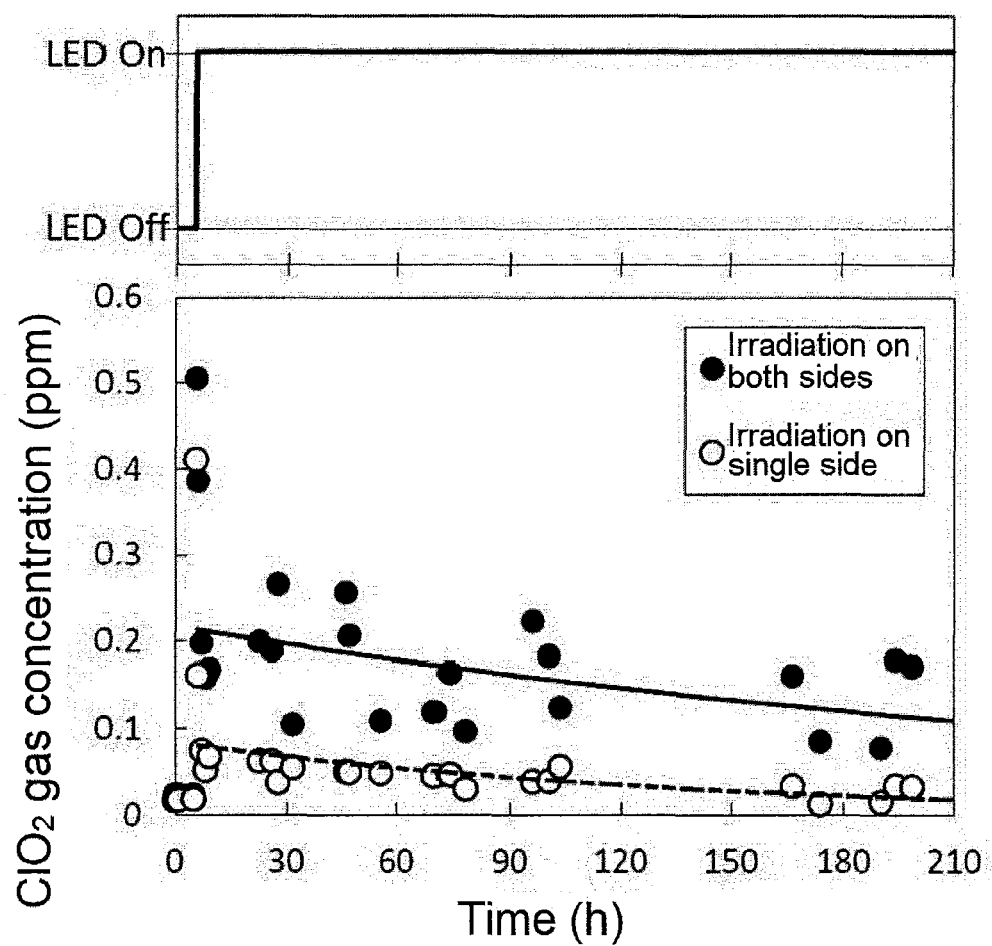

[Figure 12]
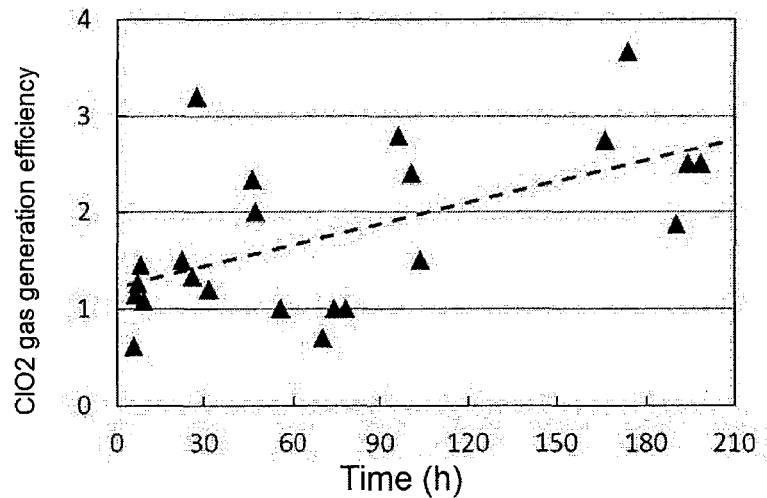
Gas generation efficiency = Gas concentration with irradiation on both sides / (Gas concentration with irradiation on single side x 2)
[Figure 13]
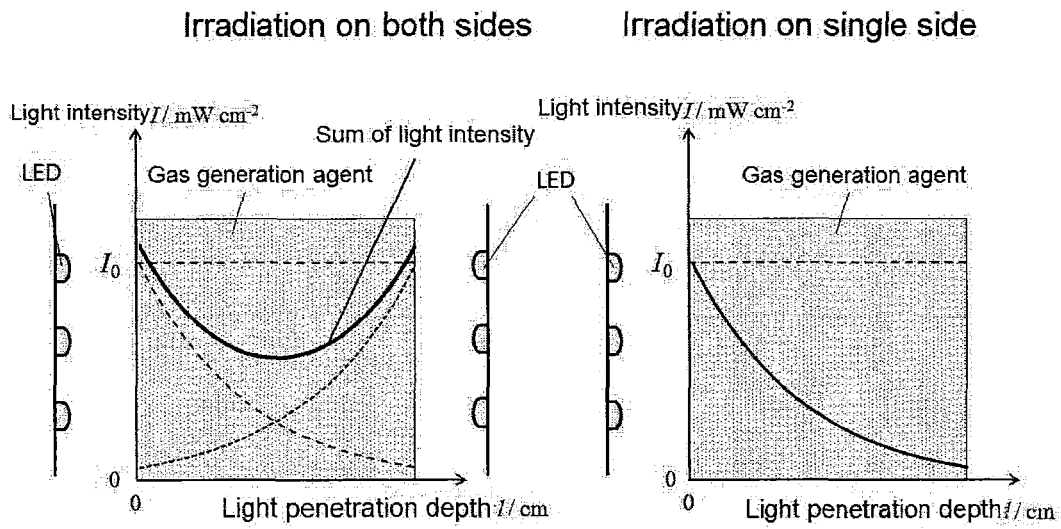

[Figure 14]
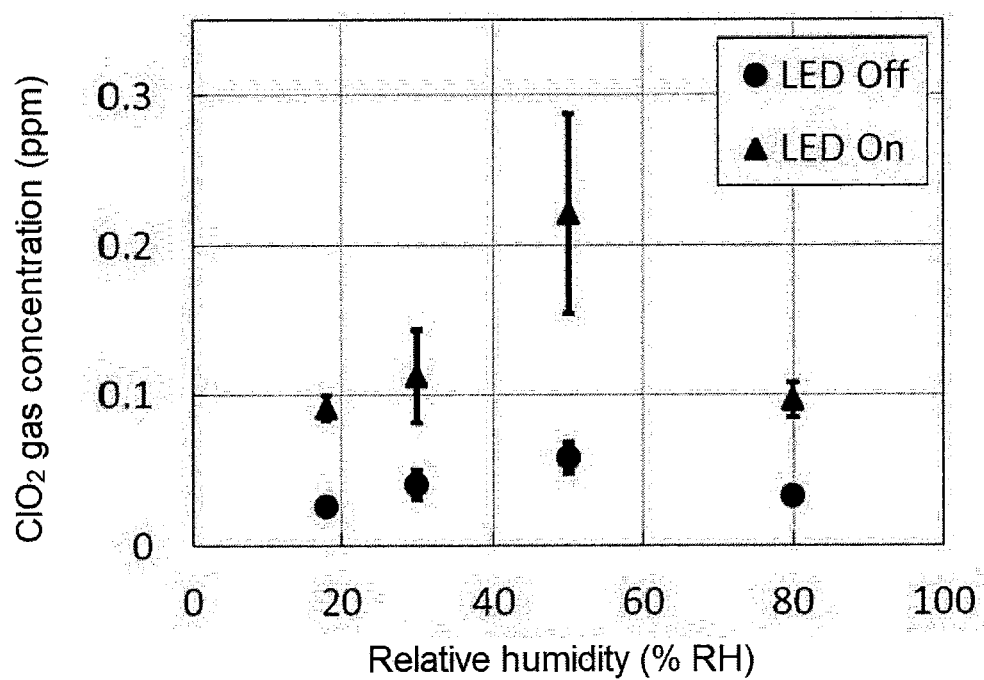

[Figure 15]
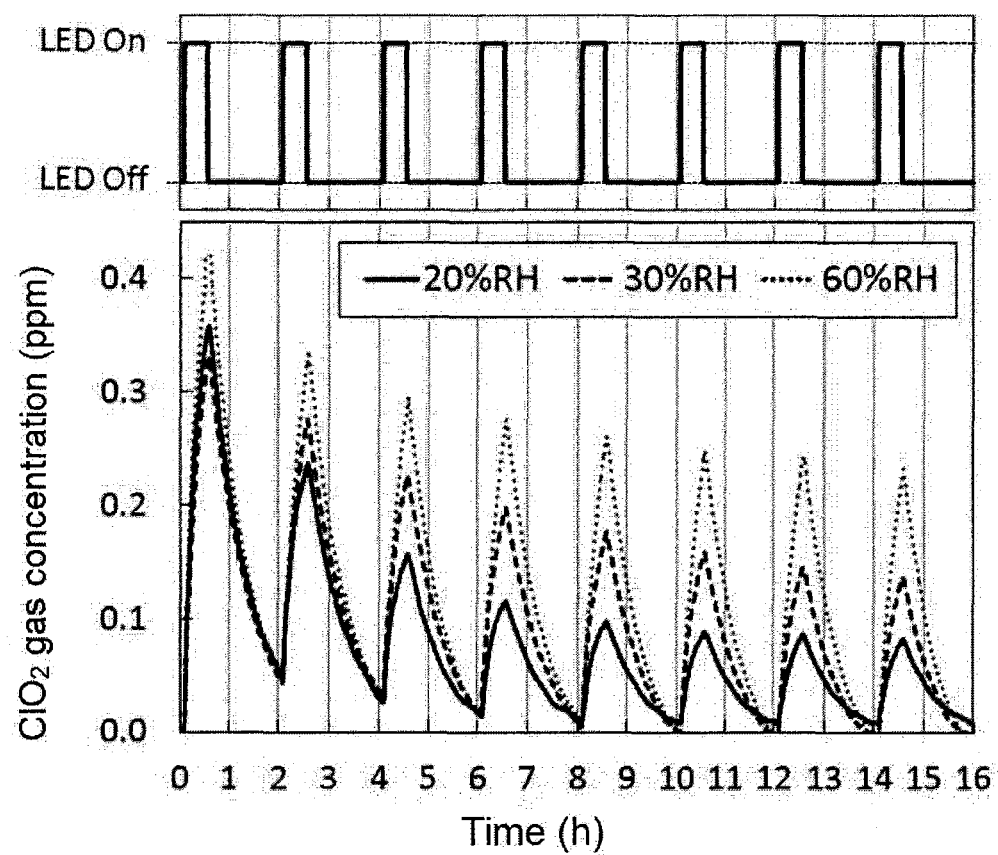

[Figure 16]
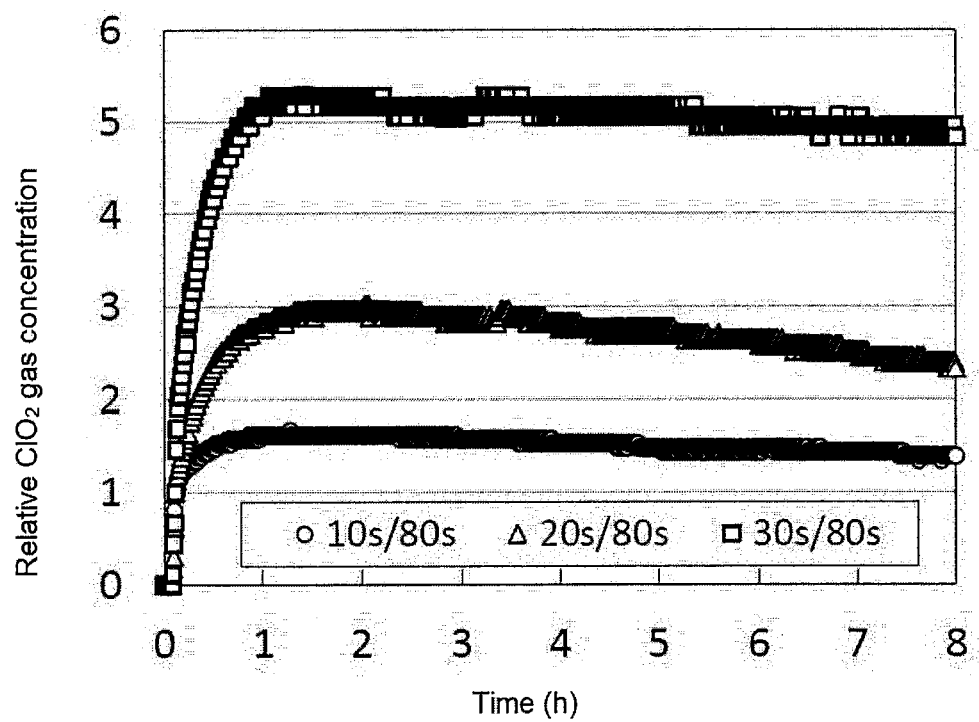

UNIT FOR CHLORINE DIOXIDE GENERATION AND CHLORINE DIOXIDE GENERATION DEVICE

TECHNICAL FIELD

The present invention relates to a chlorine dioxide generation unit and a chlorine dioxide generator. In particular, the present invention relates to a compact chlorine dioxide generation unit that utilizes the mechanism of generating chlorine dioxide by irradiating light having wavelengths in the visible region onto an agent comprising solid chlorite, as well as a Chlorine dioxide generator comprising said chlorine dioxide generation unit. The present invention may be favorably mounted particularly on automobiles (such as private cars, buses, and taxis) or other vehicles (such as airplanes, trains, and ships). Moreover, because the chlorine dioxide generation unit of the present invention is compact, it can also be integrated into e.g. air conditioning equipments such as heating equipments, cooling equipments, air cleaners, and humidifiers.

BACKGROUND ART

An apparatus for irradiating ultraviolet ray onto an aqueous solution comprising a chlorite or a gel comprising a chlorite etc. to generate chlorine dioxide has been conventionally known (e.g. Patent Literature 1). However, conventional Chlorine dioxide manufacturing apparatuses were not developed with an outlook for portability and thus many of them were large. Moreover, the main component of conventional chlorine dioxide generators is a liquid comprising a chlorite or a gel substance comprising said liquid (chlorine dioxide generation source), and there was a problem that said main component or waste liquid would spill when one would attempt carrying them. Further, even if it was simply downsized to allow portability, a new problem due to the compact size, i.e. a problem of (shortage of the Absolute amount of chlorite and) poor sustenance of chlorine dioxide generation will arise, thus making continuous use difficult.

As an apparatus that simultaneously solved the problems of "downsizing" and "continuous use" of a Chlorine dioxide generator, an apparatus for generating chlorine dioxide by incorporating an agent comprising solid chlorite into a cartridge with a given structure and irradiating ultraviolet ray thereon is known (Patent Literature 2).

CITATION LIST

Patent Literatures

[Patent Literature 1] Japanese Published Unexamined Patent Application Publication No. 2005-224386
[Patent Literature 2] WO 2011/118447

SUMMARY OF THE INVENTION

Problems to be Solved by the Invention

The apparatus described in the above Patent Literature 2 is superior in that it is compact compared to a conventional chlorine dioxide generator and enables continuous use. However, said apparatus had a further problem that the amount of chlorine dioxide generated is small compared to the apparatus for irradiating ultraviolet ray onto an aqueous solution comprising a chlorite or a gel comprising a chlorite to generate chlorine dioxide because it employs solid chlorite as the chlorine dioxide generation source.

Means for Solving the Problems

In was conventionally thought that when light is irradiated onto an agent comprising solid chlorite to generate chlorine dioxide, it is essential to employ light in the ultraviolet region which has higher energy among light of various wavelengths in order to generate chlorine dioxide more efficiently.

The present inventors performed extensive investigation to increase the amount of chlorine dioxide generated by an apparatus that employs an agent comprising solid Chlorite as the generation source of chlorine dioxide. As a result, the present inventors surprisingly found that when ultraviolet ray is irradiated onto an agent comprising solid chlorite, not only Chlorine dioxide but also ozone is generated, and due to the interference of this ozone with chlorine dioxide, the overall amount of generated chlorine dioxide is decreased compared to the amount of ozone (see also Example 1 and FIG. 3 herein).

Based on the above knowledge, the present inventors performed further investigation to increase the overall amount of Chlorine dioxide generated by an apparatus that employs an agent comprising solid chlorite as the generation source of chlorine dioxide while suppressing ozone generation. As a result, by employing light in the visible region instead of ultraviolet ray which was conventionally thought to be essential for generating chlorine dioxide from solid chlorite, the amount of ozone generated could be decreased, and the present inventors succeeded in increasing the amount of chlorine dioxide that could be generated by the apparatus as a whole.

Further, as a result of repeated improvement of the apparatus by the present inventors to compensate for the reduction in reactivity due to employing light in the visible region which has lower energy than ultraviolet ray, it was surprisingly found that when light is irradiated onto an agent comprising solid chlorite from multiple light source portions, generation efficiency of chlorine dioxide is "synergistically" improved.

By virtue of these innovations, the present inventors came to complete the chlorine dioxide generation unit of the present invention that can release practically sufficient amount of chlorine dioxide for an extremely long time while being compact, as well as a chlorine dioxide generator comprising said unit.

In other words, in one embodiment, the present invention relates to a chlorine dioxide generation unit, characterized in that said unit comprises an agent storage space portion and at least two light source portions, said light source portion is for generating light consisting of wavelengths substantially in the visible region, said agent storage space portion stores an agent comprising solid chlorite, and said agent storage space portion comprises one or more openings so that air could move in and out of said agent storage space portion, wherein chlorine dioxide gas is generated by irradiating said light generated from said light source portion onto said agent present inside said agent storage space portion.

Moreover, in one embodiment, the chlorine dioxide generation unit of the present invention is characterized in that said agent storage space portion and said at least two light source portions are integrally positioned, and said at least two light source portions irradiate light onto said agent stored inside said agent storage space portion from at least two directions.

Moreover, in one embodiment, the chlorine dioxide generation unit of the present invention is characterized in that the wavelength of said irradiated light is 360 nm-450 nm.

Moreover, in one embodiment, the chlorine dioxide generation unit of the present invention is characterized in that said light source portion comprises a lamp or a chip.

Moreover, in one embodiment, the chlorine dioxide generation unit of the present invention is characterized in that said chip is an LED chip.

Moreover, in one embodiment, the chlorine dioxide generation unit of the present invention is characterized in that said light source portion is a light source portion that can intermittently irradiate light.

Moreover, in one embodiment, the chlorine dioxide generation unit of the present invention is characterized in that said agent comprising solid chlorite is an agent comprising (A) a porous substance supporting a chlorite and (B) a metal or metal oxide catalyst.

Moreover, in one embodiment, the chlorine dioxide generation unit of the present invention is characterized in that said "porous substance supporting a chlorite" is obtained by impregnating a porous substance with an aqueous chlorite solution and then drying.

Moreover, in one embodiment, the chlorine dioxide generation unit of the present invention is Characterized in that said metal or metal oxide catalyst is selected from the group consisting of palladium, rubidium, nickel, titanium, and titanium dioxide.

Moreover, in one embodiment, the chlorine dioxide generation unit of the present invention is characterized in that said porous substance is selected from the group consisting of sepiolite, palygorskite, montmorillonite, silica gel, diatomite, zeolite, and perlite, and said chlorite is selected from the group consisting of sodium chlorite, potassium chlorite, lithium chlorite, calcium chlorite, and barium chlorite.

Moreover, in one embodiment, the chlorine dioxide generation unit of the present invention is characterized in that the mass ratio of said chlorite to said metal or metal oxide catalyst in said agent inside said agent storage space portion is 1:0.04-0.8.

Moreover, in one embodiment, the Chlorine dioxide generation unit of the present invention is Characterized in that said porous substance supports a further alkaline agent.

Moreover, in one embodiment, the chlorine dioxide generation unit of the present invention is characterized in that said alkaline agent is selected from the group consisting of sodium hydroxide, potassium hydroxide, lithium hydroxide, sodium carbonate, potassium carbonate, and lithium carbonate.

Moreover, in one embodiment, the chlorine dioxide generation unit of the present invention is characterized in that the molar ratio of said chlorite to said alkaline agent in said agent is 1:0.1-0.7.

Moreover, in one embodiment, the chlorine dioxide generation unit of the present invention is Characterized in that said "porous substance supporting a Chlorite and an alkaline agent" is obtained by simultaneously or sequentially impregnating a porous substance with a chlorite and an alkaline agent and drying.

Another embodiment of the present invention relates to a chlorine dioxide generator comprising the chlorine dioxide generation unit according to any of the Above.

Moreover, in one embodiment, the chlorine dioxide generator of the present invention is characterized in that it further comprises a blower portion for sending air to the agent stored inside said agent storage space portion in said chlorine dioxide generation unit.

Moreover, in one embodiment, the Chlorine dioxide generator of the present invention is characterized in that said blower portion is a fan for taking air from outside to inside of said chlorine dioxide generator or a fan for releasing air from inside to outside of said chlorine dioxide generator.

Moreover, in one embodiment, the chlorine dioxide generator of the present invention is characterized in that at least one of the openings of said agent storage space portion is present on the side of said agent storage space portion, and the air sent from said blower portion is at least partially sent to the agent via the openings present on the side of said agent storage space portion.

Moreover, in one embodiment, the chlorine dioxide generator of the present invention is characterized in that the relative humidity inside said agent storage space portion is retained at 30-80% RH by air sent from said blower portion.

Needless to say, any combination of one or more characteristics of the present invention above, combined so that there is no technical contradiction from the perspective of those skilled in the art, is also included in the scope of the present invention.

Effects of the Invention

By taking the above configuration, the chlorine dioxide generation unit of the present invention and a chlorine dioxide generator comprising said unit can release practically sufficient amount of chlorine dioxide for an extremely long time while being compact, and thus can be favorably employed for mounting on vehicles and the like. Moreover, because the chlorine dioxide generation unit of the present invention is compact, it can also be integrated into e.g. air conditioning equipments such as heating equipments, cooling equipments, air cleaners, and humidifiers.

BRIEF DESCRIPTION OF THE DRAWINGS

FIG. 1 shows the longitudinal section view of the chlorine dioxide generation unit that has incorporated an agent comprising solid chlorite.

FIG. 2 shows the longitudinal section view of the chlorine dioxide generator that has integrated the chlorine dioxide generation unit of FIG. 1.

FIG. 3 is a graph showing the change in observed value of chlorine dioxide and ozone concentrations in air while Changing the wavelength of irradiated light when light is irradiated onto an agent comprising solid chlorite.

FIG. 4 is a graph showing the average of measured values in the ultraviolet region and the average of measured values in the visible region among the observed values of chlorine dioxide and ozone concentrations in FIG. 3.

FIG. 5 is a graph showing the change in the amount of chlorine dioxide generated depending on the form of the metal or metal oxide catalyst mixed with the agent when light is irradiated onto an agent comprising solid chlorite.

FIG. 6 shows the change in the amount of chlorine dioxide generated when the proportion of chlorite and titanium dioxide in an agent comprising solid Chlorite and a metal or metal oxide catalyst (titanium dioxide) is changed.

FIG. 7 shows the relationship between the titanium dioxide content in an agent comprising solid chlorite and a metal or metal oxide catalyst (titanium dioxide) and the maximum value of chlorine dioxide concentration generated by irradiating visible light.

FIG. 8 shows the change in the amount of chlorine dioxide generated when visible light is continuously irradiated onto an agent comprising solid chlorite and a metal or metal oxide catalyst (titanium dioxide) for an extended period of time.

FIG. 9 shows the perspective view, the top view, and the side view of the chlorine dioxide generation unit which is one embodiment of the present invention.

FIG. 10 shows the schematic diagram of a chlorine dioxide generator that has integrated the chlorine dioxide generation unit which is one embodiment of the present invention.

FIG. 11 shows the comparison of the amount of chlorine dioxide generated in the chlorine dioxide generation unit which is one embodiment of the present invention when light is irradiated onto the agent inside the agent storage space portion only from one light source portion (single side) and when light is irradiated onto the same from two light source portions (both sides).

FIG. 12 shows a plot of the ratio of the amount of chlorine dioxide generated in the chlorine dioxide generation unit which is one embodiment of the present invention when light is irradiated onto the agent inside the agent storage space portion only from one light source portion (single side) and when light is irradiated onto the same from two light source portions (both sides). Note that in order to show that the amount of chlorine dioxide generated will be two folds or more when light is irradiated from two light source portions (both sides) compared to when light is irradiated only from one light source portion (single side), a two-folds value is employed for the amount of chlorine dioxide generated from single-side irradiation for calculating the ratio of the amount of chlorine dioxide generated.

FIG. 13 is figures describing that light can be efficiently delivered to the agent inside the agent storage space portion when light is irradiated from two light source portions (both sides) compared to when light is irradiated only from one light source portion (single side) in the chlorine dioxide generation unit which is one embodiment of the present invention.

FIG. 14 shows the change in the amount of chlorine dioxide generated when the relative humidity inside the agent storage space portion is changed in the chlorine dioxide generation unit which is one embodiment of the present invention. Note that FIG. 14 shows the data of when light is irradiated only from one light source portion (single side).

FIG. 15 shows the change over time of the amount of chlorine dioxide generated when the relative humidity inside the agent storage space portion is changed in the chlorine dioxide generation unit which is one embodiment of the present invention. Note that FIG. 15 shows the data of when light is irradiated from two light source portions (both sides).

FIG. 16 shows the change over time of the amount of chlorine dioxide generated when light is irradiated intermittently onto the agent inside the agent storage space portion from two light source portions (both sides) in the chlorine dioxide generation unit which is one embodiment of the present invention. Note that "10 s/80 s" in the figure indicates that light was continuously irradiated for the first 2 minutes of irradiation, and after the first 2 minutes of irradiation, a cycle of irradiating light for 10 seconds (LED ON) and stopping irradiation for 80 seconds (LED OFF) was repeated. Similarly, "20 s/80 s" in the figure indicates that light was continuously irradiated for the first 2 minutes of irradiation, and after the first 2 minutes of irradiation, a cycle of irradiating light for 20 seconds (LED ON) and stopping irradiation for 80 seconds (LED OFF) was repeated, and "30 s/80 s" indicates that light was continuously irradiated for the first 2 minutes of irradiation, and after the first 2 minutes of irradiation, a cycle of irradiating light for 30 seconds (LED ON) and stopping irradiation for 80 seconds (LED OFF) was repeated.

DESCRIPTION OF EMBODIMENTS

In one embodiment, the present invention relates to a chlorine dioxide generation unit, characterized in that said unit comprises an agent storage space portion and at least two light source portions, said light source portion is for generating light consisting of wavelengths substantially in the visible region, said agent storage space portion stores an agent comprising solid chlorite, and said agent storage space portion comprises one or more openings so that air could move in and out of said agent storage space portion, wherein chlorine dioxide gas is generated by irradiating said light generated from said light source portion onto said agent present inside said agent storage space portion.

The chlorine dioxide generation unit of the present invention comprises at least two light source portions (such as 2, 3, 4, 5, 6, or more light source portions), and the positional relationship of said at least two light source portions is not particularly limited as long as light can be irradiated onto the agent which is the generation source of chlorine dioxide from at least two directions (such as 2, 3, 4, 5, 6, or more directions). Preferably, the at least two light source portions are positioned in symmetrical positions with the agent which is the generation source of Chlorine dioxide as the center.

A conventional well-known light source can be employed as the light source used in the present invention, as long as it emits light in the visible region alone or light comprising the visible region. Accordingly, the wavelength of light generated from the light source employed in the present invention is not limited to the wavelength of light in the visible region (360 nm-830 nm), but may be light comprising the wavelength of light in the ultraviolet region (~360 nm) and the wavelength of light in the infrared region (830 nm ~). However, ozone is liable to be generated as byproduct when light of the ultraviolet region wavelength is irradiated onto an agent comprising solid chlorite. Moreover, since the energy of light of the infrared region wavelength is weak, the amount of chlorine dioxide generated is small even though an agent comprising solid chlorite is irradiated. Accordingly, light generated from the light source used in the present invention is preferably light having wavelengths substantially in the visible region. The light generated from the light source used in the present invention is preferably light having wavelengths of 360 nm-450 nm, further preferably light having wavelengths of 380 nm-450 nm or 360 nm-430 nm, and most preferably light having wavelengths of 380 nm-430 nm.

The confirmation that the wavelength of light generated from the light source is included substantially in a particular wavelength region range can be made by measuring the wavelength or energy of light generated from the light source by a well-known measuring instrument.

The light source used in the present invention is not particularly limited as long as it generates light having wavelengths in the visible region, and e.g. various sources that generate light in the visible region such as a lamp (an incandescent lamp and an LED lamp), a chip, and a laser apparatus can be employed. In terms of the directionality of light generated from the light source as well as downsizing of apparatus, it is preferred to employ a light source in chip form. A light source in chip form, by virtue of its narrow directionality, can efficiently irradiate light onto an irradiation target object without diffusion of light, and can thus improve the chlorine dioxide generation efficiency of the apparatus. Moreover, in terms of limiting the wavelength of light generated from the light source so that it does not include light in the ultraviolet or infrared region, it is preferred to employ LED that generates light in the visible region as the light source. In particular, in terms of downsizing of apparatus as well as the generation efficiency of chlorine dioxide, the light source used in the present invention is most preferably an LED chip that generates light in the visible region.

Moreover, the light source used in the present invention may be a light source that can intermittently irradiate light. For example, the light source used in the present invention may be a light source that repeats the cycle of irradiating light for a certain amount of time, and then stopping irradiation for a certain amount of time. The method for controlling the light source for intermittently irradiating light is not particularly limited, and can be performed with a method well-known to those skilled in the art.

The light source portion and the agent storage space portion in the chlorine dioxide generator of the present invention may be integrally positioned or may be separately positioned, and it is preferred to be integrally positioned in order to efficiently irradiate light generated from the light source portion onto the agent stored in the agent storage space portion. Here, the light source portion and the agent storage space portion may be integrally positioned or connected in an inseparable manner, or may be integrally positioned or connected in an separable manner. When the light source portion and the agent storage space portion are integrally positioned or connected in a separatable manner, the agent storage space portion may be an exchangeable cartridge.

The agent storage space portion employed in the present invention is not limited in its material or structure, as long as it comprises one or more openings so that air can move in and out. For example, by employing a well-known light transmissible material as the material of the agent storage space portion (in particular, of the agent storage space portions, the face where the light from the light source portion is directly irradiated), the light irradiated from the light source portion can be irradiated onto the agent inside the agent storage space portion. Preferably, by making the material of the agent storage space portion out of a resin that allows transmission of light substantially in the visible region, light generated from the light source portion can be irradiated onto the agent inside the agent storage space portion without being absorbed by the resin. A resin that allows transmission of light having wavelengths substantially in the visible region herein may be e.g. a resin that allows transmission of 80% or more of the irradiated light having wavelengths in the visible region, preferably a resin that allows transmission of 90% or more of the irradiated light having wavelengths in the visible region, and further preferably a resin that allows transmission of 95% or more of the irradiated light having wavelengths in the visible region. Specifically, of the agent storage space portions, the material of the face where the light from the light source portion is directly irradiated that can be employed are an acrylic sheet or a transparent vinyl chloride sheet, although this is not to be particularly limiting.

Moreover, for example, the agent storage space portion can also be configured by a mesh sheet having a mesh to a degree that the stored material does not fall through. According to such a configuration, the air outside of the agent storage space portion could move in and out of the agent storage space portion, and light generated from the light source portion is irradiated onto the agent inside the agent storage space portion through the mesh.

Examples of the chlorite used in the present invention include an alkali metal Chlorite or an alkaline earth metal chlorite. Examples of an alkali metal chlorite include sodium Chlorite, potassium chlorite, and lithium chlorite, and examples of an alkaline earth metal chlorite include calcium chlorite, magnesium chlorite, and barium chlorite. Among these, sodium chlorite and potassium Chlorite are preferred, and sodium Chlorite is the most preferred in that it is easily obtained. These chlorites may be employed alone, or two or more may be used in combination.

The solid chlorite used in the present invention may be supported on a porous substance. In the present invention, by supporting a solid chlorite on a porous substance and reacting it with light on the surface of the porous substance, the reaction can be caused with a smaller energy compared to when employing a solid chlorite as it is. In other words, in the present invention, chlorine dioxide can be generated more efficiently by employing a solid Chlorite supported on a porous substance. Examples of the porous substance used in the present invention that can be used are sepiolite, palygorskite, montmorillonite, silica gel, diatomite, zeolite, and perlite, but those that are alkaline when suspended in water is preferred in order to prevent degradation of the Chlorite, more preferably palygorskite and sepiolite, and particularly preferably sepiolite.

In the present invention, the method for supporting a chlorite on a porous substance is not particularly limited. For example, a "porous substance supporting a Chlorite" can be obtained by impregnating a porous substance with an aqueous chlorite solution and drying. The water content of the "porous substance supporting a chlorite" is preferably 10% by weight or less, further preferably 5% by weight or less.

The "porous substance supporting a Chlorite" used in the present invention may be of any particle size, and in particular those having an average particle size of 1 mm-3 mm can be favorably used.

The average particle size of the "porous substance supporting a chlorite" in the present invention can be calculated by measuring the particle size of the "porous substance supporting a chlorite" that is employed by an optical microscope etc., performing statistical processing, and then calculating the average value and standard deviation.

The chlorite concentration in the "porous substance supporting a chlorite" used in the present invention is effective at 1% by weight or more, and since more than 25% by weight will fall under a deleterious substance, it is preferably 1% by weight or more to 25% by weight or less, more preferably 5% by weight or more to 20% by weight or less.

The "agent comprising solid chlorite" used in the present invention may further comprise a metal or metal oxide catalyst. For example, the "agent comprising solid chlorite" used in the present invention may be an agent comprising (A) a porous substance supporting a chlorite and (B) a metal or metal oxide catalyst.

Examples of the metal or metal oxide catalyst used in the present invention include palladium, rubidium, nickel, titanium, and titanium dioxide. Among these, in particular titanium dioxide is favorably employed. Note that titanium dioxide may be simply referred to as titanium oxide or titania. Various forms such as powders and granules can be used for the metal or metal oxide catalyst used in the present invention, and those skilled in the art can appropriately select the preferred form depending on the mixture proportion of chlorite and metal or metal oxide catalyst in the agent. For example, when the proportion of the metal or metal oxide catalyst in the agent is relatively high, granular metal or metal oxide catalyst can be selected, and when the proportion of the metal or metal oxide catalyst in the agent is relatively low, powdered metal or metal oxide catalyst can be selected, although this is not limiting.

Rough indication of size for "powders" or "granules" herein is e.g. solids having an average particle size of 0.01 mm-1 mm for powders, and solids having an average particle size of 1 mm-30 mm for granules, although this is not to be particularly limiting.

The mass ratio of the chlorite to the metal or metal oxide catalyst in the agent employed in the present invention may be chlorite:metal or metal oxide catalyst=1:0.04-0.8, preferably 1:0.07-0.6, and more preferably 1:0.07-0.5. In either of when the metal or metal oxide catalyst content is more than one fold of the chlorite content in the agent and when the metal or metal oxide catalyst content is less than 0.04 folds of the chlorite content in the agent, the amount of chlorine dioxide generated may be reduced when visible light is irradiated.

The "porous substance supporting a chlorite" employed in the present invention may further support an alkaline agent.

Examples of the alkaline agent used in preparing the agent of the present invention that can be employed are sodium hydroxide, potassium hydroxide, lithium hydroxide, hydroxylation cesium, hydroxylation rubidium, sodium carbonate, potassium carbonate, and lithium carbonate, preferably sodium hydroxide. By further supporting an alkaline agent on the "porous substance supporting a chlorite," the pH of the agent employed in the present invention can be adjusted and thus the stability of the agent per se can be increased, and idle chlorine dioxide release such as during storage when light irradiation is not being performed can be suppressed.

The appropriate amount of the alkaline agent used in preparing the agent of the present invention against chlorite (mol) is 0.1 equivalents or more to 0.7 equivalents or less, preferably 0.1 equivalents or more to 0.3 equivalents or less. When it is less than 0.1 equivalents, there is a possibility that the supported chlorite will be degraded even at ordinary temperatures, and when it is more than 0.7 equivalents, the stability will improve but chlorine dioxide generation will become difficult and generation concentration will be reduced, and thus are not preferred.

In the preparation of the agent of the present invention, the method for further supporting an alkaline agent on the "porous substance supporting a chlorite" is not particularly limited, and for example a method of simultaneously or sequentially impregnating a porous substance with a Chlorite and an alkaline agent and drying may be employed. Note that in the present invention, the composition of interest is sometimes obtained by "spray adsorbing" an aqueous Chlorite solution and/or alkaline agent onto a porous substance and drying, and the term "spray adsorbing" herein is to be encompassed in the term "impregnation."

In one embodiment, the present invention may be configured as a chlorine dioxide generator comprising the chlorine dioxide generation unit of the present invention. The chlorine dioxide generator of the present invention may further comprise a blower portion for sending air to the agent stored in the agent storage space portion of the Chlorine dioxide generation unit. Said blower portion may be for taking air from outside to inside of the apparatus, or may be for releasing air from inside to outside of the apparatus.

In the chlorine dioxide generator of the present invention, the blower portion for sending air to the agent stored in the agent storage space portion may be e.g. a fan or an air pump, preferably a fan. More air can be supplied to the agent inside the agent storage space portion by providing such a blower portion. Since the contact frequency of the agent comprising solid chlorite and moisture in air (water vapor) is increased by supplying more air to the agent, chlorine dioxide will be more easily generated from the solid chlorite onto which light is irradiated.

In the Chlorine dioxide generator of the present invention, the relative humidity inside the agent storage space portion can be adjusted to 30-80% RH (preferably 40-70% RH, further preferably 40-60% RH) by air sent from said blower portion. The amount of Chlorine dioxide generated can be increased by adjusting the relative humidity inside the agent storage space portion to said range.

Moreover, in the chlorine dioxide generator, of the present invention, another method that can also be utilized for supplying water vapor in the air into the agent storage space portion is the Peltiert element (Peltiert effect) that condenses and collects the moisture in air (the disadvantage of Peltiert element that causes invasion or condensation of water vapor can also be counterutilized to work on elevating humidity.)

The method for controlling the relative humidity inside the apparatus is not particularly limited, and those skilled in the art can appropriately carry this out with a well-known technology. For example, a hygrometer may be set up for measuring humidity inside the apparatus body, and the amount of blast from the blower portion is adjusted while monitoring the moisture amount, or relative humidity is controlled by adjusting the moisture absorption amount by the Peltiert element.

Moreover, because the chlorine dioxide generation unit of the present invention is compact, it can also be integrated into e.g. home appliances that do not have chlorine dioxide generation as their main objective. Note that an apparatus that has integrated the chlorine dioxide generation unit of the present invention into e.g. a home appliance that does not have chlorine dioxide generation as its main objective is also included in the "chlorine dioxide generator" of the present invention. For example, by integrating the chlorine dioxide generation unit of the present invention into air conditioning equipments such as heating equipments, cooling equipments, air cleaners, and humidifiers, by virtue of the effect of the wind released from the air conditioning equipment, chlorine dioxide generation in the chlorine dioxide generation unit is promoted, while at the same time chlorine dioxide can be efficiently diffused into space along with the wind released from the air conditioning equipment into space.

The terms used herein are employed for describing particular embodiments, and do not intend to limit the invention.

Moreover, the term "comprising" as used herein, unless the content clearly indicates to be understood otherwise, intends the presence of the described items (such as components, steps, elements, or numbers), and does not exclude the presence of other items (such as components, steps, elements, or numbers).

Unless otherwise defined, all terms used herein (including technical and scientific terms) have the same meanings as those broadly recognized by those skilled in the art of the technology to which the present invention belongs. The terms used herein, unless explicitly defined otherwise, are to be construed as having meanings consistent with the meanings herein and in related technical fields, and shall not be construed as having idealized or excessively formal meanings.

The embodiments of the present invention may be described with reference to schematic diagrams. In such a case, they may be exaggerated in presentation in order to allow clear description.

In the present specification, for example when expressed as "1-10%," those skilled in the art will recognize that said expression individually and specifically indicates 1, 2, 3, 4, 5, 6, 7, 8, 9, or 10%.

Any and all numeric values employed herein for indicating component content or numeric value range and the like, unless explicitly indicated, is construed as encompassing the meaning of the term "approximately." For example, unless explicitly indicated, "10 folds" is understood to mean "approximately 10 folds."

All of the disclosures of the literatures cited herein should be deemed as cited herein, and those skilled in the art will cite and recognize the related disclosed contents in these prior art literatures as a part of the present specification according to the context herein without departing from the spirit and scope of the present invention.

The present invention will now be described in further detail with reference to Examples. However, the present invention can be embodied by various aspects, and shall not be construed as being limited to the Examples described herein.

EXAMPLES

Example 1

Change in the Amount of Chlorine Dioxide Generated Depending on the Wavelength of Irradiated Light In this Example, tests were carried out with the chlorine dioxide generation unit and chlorine dioxide generator described in FIGS. 1 and 2.

FIG. 1 is the longitudinal section view showing the internal structure of the agent storage space portion and the light source portion of the chlorine dioxide generation unit employed in this Example. As shown in FIG. 1, chlorine dioxide generation unit 10 comprises an agent storage space portion 11 and a light source portion for generating light in the visible region (LED chip 12 and operation circuit board 13). The agent storage space portion 11 comprises a test agent 14. The agent storage space portion 11 comprises openings 16 so that air can move in and out. The chlorine dioxide generation unit 10 comprises a tube 15 for introducing air outside the apparatus into the apparatus.

Air introduced from tube 15 is supplied to the agent storage space portion 11 though openings 16. Water vapor contained in the supplied air is incorporated into the chlorite in test agent 14. Light in the visible region generated from the light source portion is transmitted through the bottom of the agent storage space portion 11 and irradiated onto test agent 14 present inside the agent storage space portion 11. The chlorite comprising water vapor reacts with the irradiated light to generate chlorine dioxide. Titanium dioxide which is contained in test agent 14 along with the chlorite promotes the reaction of generating chlorine dioxide from the chlorite by having light in the visible region irradiated thereon. The generated chlorine dioxide is exhausted out through openings 16.

FIG. 2 is the longitudinal section view showing the overall structure of the chlorine dioxide generator employed in this Example. As shown in FIG. 2, chlorine dioxide generator 20 comprises chlorine dioxide generation unit 21 inside thereof. The apparatus body 22 of the chlorine dioxide generator 20 comprises an air supply port 23 for introducing air outside the apparatus into the apparatus and an air exhaust port 25 for exhausting air inside the apparatus out of the apparatus. Further, the chlorine dioxide generator 20 comprises a fan 24 inside thereof in order to introduce air efficiently into the apparatus.

By activating the fan 24, air inside the apparatus body 22 is introduced from the air supply port 23. The introduced air passes through the chlorine dioxide generation unit 21 installed inside the apparatus and is exhausted from the air exhaust port 25. Since in the chlorine dioxide generation unit 21, chlorine dioxide is generated in a mechanism similar to the apparatus described in FIG. 1, air exhausted from the air exhaust port 25 comprises chlorine dioxide.

After spray adsorbing 70 g of 10 wt % aqueous sodium chlorite solution onto 100 g of sepiolite and drying, 20 g of 10 wt % aqueous sodium hydroxide solution was further spray adsorbed and dried. This was mixed with 20 g of powdered titanium dioxide prepared by treating titanium powder by calcination to be used as the test agent employed in this Example.

The above agent was stored in the agent storage space portion in the chlorine dioxide generator described in FIG. 2. Air was introduced into the agent storage space portion through the openings of the agent storage space portion at 1 L/min, and light was irradiated onto the agent inside the agent storage space portion from the LED chip. The wavelength of light irradiated from the LED chip was changed by 2 nm from 80 nm to 430 nm, and chlorine dioxide and ozone concentrations contained in the air exhausted from the chlorine dioxide generator was measured. Note that this Example was carried out by housing the chlorine dioxide generator in a chamber of approximately 7 liters, and the measurement of chlorine dioxide and ozone concentrations was carried out by measuring chlorine dioxide and ozone concentrations inside said chamber. The results thereof are shown in FIGS. 3 and 4. Note that a frequency counter (MCA3000, Tektronix, Inc.), a spectrum analyzer (BSA, Agilent Technologies), a swept wavelength tunable laser (TSL-510, SANTEC CORPORATION), an accumulated UV meter (UIT-250, USHIO INC.), and an accumulated UV meter detector (VUV-S172, UVD-C405, USHIO INC.) were employed for this test.

FIG. 3 is a graph showing the observed values of chlorine dioxide and ozone concentrations in air at various wavelengths of light, and FIG. 4 is a graph comparing the average of measured values in the ultraviolet region (80 nm-358 nm) and the average of measured values in the visible region (360 nm-430 nm) among the above measured values. Note that in FIG. 4, the average of measured values of chlorine dioxide in ultraviolet and visible regions were approximately 2.25 ppm and approximately 4.87 ppm, respectively, and the average of measured values of ozone in ultraviolet and visible regions were approximately 7.04 ppm and approximately 3.04 ppm, respectively.

As shown in FIG. 3, it was shown that when shifting the wavelength of light irradiated onto the agent from the ultraviolet region to the visible region, the ozone concentration in air will be at the maximum in the ultraviolet region, and decreases from the ultraviolet region to the visible region. On the other hand, it was surprisingly shown that the chlorine dioxide concentration in air increases from the ultraviolet region to the visible region. From this result, those skilled in the art shall recognize that the range of wavelength favorably employed in the present invention is useable without any problems at higher than 430 nm which is upper limit of the measurement range of this Example, for example even at a wavelength of at least about 450 nm.

Further, as shown in FIG. 4, when the average values of each of ozone and chlorine dioxide concentrations in air in the ultraviolet and visible regions are compared, the ozone concentration decreased approximately 43% from the ultraviolet region to the visible region, whereas the Chlorine dioxide concentration increased approximately 213% from the ultraviolet region to the visible region.

In other words, it was found that chlorine dioxide can be generated extremely efficiently by irradiating light in the visible region onto a mixture of a solid chlorite and a metal or metal oxide catalyst compared to irradiating light in the ultraviolet region.

Example 2

Change in the Amount of Chlorine Dioxide Generated Depending on the Form of the Catalyst As Sample 1 employed in this Example, an agent was prepared with a method similar to that in Example 1 except that granular titanium dioxide (prepared by treating titanium by calcination) was employed. As Samples 2 and 3 employed in this Example, agents were prepared with a method similar to that in Example 1.

The agents prepared by the above method (Samples 1-3) were each stored in the agent storage space portion of the chlorine dioxide generator described in Example 1. For Samples 1 and 2, air was introduced into the apparatus through the openings of the agent storage space portion at 1 L/min, and light at 405 nm was irradiated from the LED chip of the light source portion. For Sample 3, only air was introduced into the apparatus through the openings of the agent storage spade portion at 1 L/min, and no light was irradiated. The concentration of chlorine dioxide contained in the air exhausted from the apparatus up until 11 hours from the start of irradiation was measured. The measurement results for each of Samples 1-3 are shown in FIG. 5.

As shown in FIG. 5, it was found that Chlorine dioxide may be generated more efficiently when granular titanium dioxide was mixed in the agent (Sample 1) compared to when powdered titanium dioxide was mixed in the agent (Sample 2).

Example 3

Investigation of the Content Ratio of Chlorite to Titanium Dioxide in the Agent

After spray adsorbing 70 g of 10 wt % aqueous sodium chlorite solution onto 100 g of sepiolite and drying, 20 g of 10 wt % aqueous sodium hydroxide solution was further spray adsorbed and dried. This was mixed with varying amounts of powdered titanium dioxide to be used as test agents employed in this Example. Irradiation of visible light onto the test agent was carried out with the same chlorine dioxide generator and irradiation method as Example 1, and the measurement of Chlorine dioxide concentration was also carried out similarly to Example 1.

FIG. 6 shows the change in the amount of chlorine dioxide generated when the proportion of chlorite and titanium dioxide in the composition of the present invention is changed. The relationship between the titanium dioxide content (wt %) in the agent, the mass ratio of chlorite to titanium dioxide in the agent, and the chlorine dioxide concentration (pgri) contained in air after one hour from the start of visible light irradiation shown in FIG. 6 are shown in Table 1. Moreover, FIG. 7 shows the relationship between the titanium dioxide content in the agent of the present invention and the maximum value of chlorine dioxide concentration generated by irradiating visible light.

TABLE 1

| Titanium dioxide content | Chlorite:Titanium dioxide | Chlorine dioxide concentration in air |
| --- | --- | --- |
| 0 wt % | 1:0 | 1.3 ppm |
| 0.5 wt % | 1:0.04 | 1.6 ppm |
| 1 wt % | 1:0.09 | 3.3 ppm |
| 2 wt % | 1:0.17 | 3.8 ppm |
| 3 wt % | 1:0.26 | 4.2 ppm |
| 5 wt % | 1:0.43 | 3.3 ppm |
| 7 wt % | 1:0.60 | 2.3 ppm |
| 9 wt % | 1:0.77 | 2.0 ppm |
| 11 wt % | 1:0.94 | 0.80 ppm |
| 13 wt % | 1:1.11 | 0.55 ppm |
| 21 wt % | 1:1.79 | 0.30 ppm |

As shown in FIGS. 6 and 7 and Table 1, it was shown that when visible light is irradiated onto the test agent, the amount of chlorine dioxide generated increases as the mass proportion of titanium dioxide against chlorite in the agent increases from 0 to approximately 0.3, and is gradually reduced when the mass proportion of titanium dioxide against chlorite becomes greater than approximately 0.3. Further, it was shown that when the mass proportion of titanium dioxide against chlorite in the composition is greater than approximately 1.0, the amount of chlorine dioxide generated is reduced compared to when titanium dioxide is not mixed.

FIG. 8 shows the change in the amount of chlorine dioxide generated when visible light is continuously irradiated onto the test agent of this Example for an extended period of time. As shown in FIG. 8, it was confirmed that even when observed over an extended period of time, similarly to the results shown in FIG. 6 or 7, chlorine dioxide at a high concentration is continuously and stably released when the mixture proportion (mass ratio) of chlorite and titanium dioxide in the test agent is 1:0.04-0.8 (preferably 1:0.07-0.6, more preferably 1:0.07-0.5) compared to when the mixture proportion is in some other range.

Example 4

Investigation of the Sandwich Structure of the Light Source Portion

The effectiveness of the sandwich structure of the light source portion in the present invention was tested. In this Example, experiments were carried out with the chlorine dioxide generation unit described in FIG. 8 and the Chlorine dioxide generator described in FIG. 9.

FIG. 9 shows the internal structure of chlorine dioxide generation unit 30 which is one embodiment of the present invention. As shown in FIG. 9, the chlorine dioxide generation unit 30 of the present invention comprises an agent storage space portion 32 and a light source portion for generating light in the visible region (electron circuit board 33 and LED chip 34). The agent storage space portion 32 internally comprises an agent comprising solid chlorite. The agent storage space portion 32 comprises openings (gas generation port 31 and air introduction port 36) so that air can move in and out.

The air introduced from the air introduction portion 36 is supplied to inside of the agent storage space portion 32. The water vapor contained in the supplied air is incorporated into the test agent stored in the agent storage space portion 32. Light in the visible region generated from the light source portion is transmitted through outer casing portion 35 of the agent storage space portion 32 and irradiated onto the agent stored inside the agent storage space portion 32. The test agent comprising water vapor reacts with the irradiated light to generate chlorine dioxide. The generated chlorine dioxide is released outside through gas generation port 31.

FIG. 10 shows the internal structure of chlorine dioxide generator 40 which is one embodiment of the present invention. As shown in FIG. 10, the chlorine dioxide generator 40 of the present invention internally comprises the chlorine dioxide generation unit which is one embodiment of the present invention (LED chip mounted on circuit board 41 and agent storage space portion 42). The chlorine dioxide generator further internally comprises a blower fan 44, and air is supplied to inside of the chlorine dioxide generation unit by activating the blower fan 44. The relative humidity inside the agent storage space portion in the chlorine dioxide generation unit can be adjusted by adjusting the activation of the blower fan 44.

Air is supplied from the air introduction port of the chlorine dioxide generation unit to inside of the agent storage space portion by activating the blower fan 44. The water vapor contained in the supplied air incorporated into the test agent stored in the agent storage space portion. Light in the visible region generated from the light source portion is transmitted through the outer casing portion of the agent storage space portion and irradiated onto the agent stored inside the agent storage space portion. The test agent comprising water vapor reacts with the irradiated light to generate chlorine dioxide. The generated chlorine dioxide is released outside through the gas generation port.

After spray adsorbing 70 g of 10 wt % aqueous sodium chlorite solution onto 100 g of sepiolite and drying, 20 g of 10 wt % aqueous sodium hydroxide solution was further spray adsorbed and dried. This was mixed with approximately 1.8 g of powdered titanium dioxide to be used as the test agent employed in this Example. The test agent prepared was stored in the agent storage space portion of the chlorine dioxide generation unit described in FIG. 9, and visible light was irradiated from a double-faced light source portion (100 mm$^2$ each). This test was carried out inside a 1 m$^3$ chamber, the temperature inside the chamber was approximately 26° C., and the relative humidity was approximately 40%. In the Comparative Example, tests were carried out similarly to the Example except that a single-faced (single side) light source portion was employed for irradiation of visible light.

The results of measuring the Change over time of chlorine dioxide concentration inside the chamber in the Example and Comparative Example are shown in FIG. 11. Moreover, the ratio of chlorine dioxide concentration inside the Chamber in the Example and Comparative Example at each timepoint from the start of irradiation is shown in FIG. 12. Note that in FIG. 12, in order to show that the amount of chlorine dioxide generated will be two folds or more when light is irradiated from two light source portions (both sides) compared to when light is irradiated only from one light source portion (single side), a two-folds value is employed for the amount of chlorine dioxide generated from single-side irradiation for calculating the ratio of the amount of Chlorine dioxide generated.

Surprisingly, as shown in FIGS. 11 and 12, it was shown that the amount of chlorine dioxide generated will be two folds or more when visible light was irradiated from two light source portions (both sides) compared to when visible light was irradiated only from one light source (single side). Further, as shown in FIG. 12, it was also shown that the ratio value of the amount of Chlorine dioxide generated in the Example against the amount of chlorine dioxide generated in the Comparative Example further increases with time.

The above result may be explained by FIG. 13. In other words, because light intensity decreases exponentially when light passes through a medium, it is difficult to deliver light to the inside or the depth of the agent with irradiation only from a single side, and it is difficult to efficiently irradiate light onto the entire agent. However, by irradiating light onto the agent from two directions (or two or more directions), it will became possible to supply the amount of light necessary for reaction to the inside of the agent, thereby enabling efficient generation of chlorine dioxide.

Example 5

Investigation of the Relative Humidity of the Agent Storage Space Portion

The chlorine dioxide generation unit described in FIG. 9 and the chlorine dioxide generator described in FIG. 10 were employed to investigate the change in the amount of chlorine dioxide generated depending on the relative humidity inside the agent storage space portion.

Conditions similar to Example 4 were employed for the agent stored in the agent storage space portion, the irradiation method of visible light, and the measurement of chlorine dioxide concentration. The relative humidity inside the agent storage space portion was adjusted by controlling the amount of air supplied to the agent storage space portion (i.e. the amount of water vapor supplied to the agent) by activating the blower fan. The relationship between the relative humidity inside the agent storage space portion and the chlorine dioxide concentration inside the chamber are shown in FIGS. 14 and 15. FIG. 14 shows the averaged value of the chlorine dioxide concentration measured multiple times during 0.5 to 2 hours of light irradiation as well as the standard deviation thereof, and FIG. 15 shows the change over time of Chlorine dioxide concentration inside the chamber.

As shown in FIG. 14, it was shown that the amount of chlorine dioxide generated can be increased by adjusting the relative humidity inside the agent storage space portion to 30-80% RH (preferably 50-70% RH, further preferably 40-60% RH). Note that it is thought that when the relative humidity inside the agent storage space portion is less than 30%, the moisture necessary for the reaction of generating chlorine dioxide from a chlorite will become inadequate, and when the relative humidity is higher than 80%, the amount of chlorine dioxide released as gas will be decreased because the generated chlorine dioxide will dissolve into the condensed water.

Moreover, as shown in FIG. 15, by adjusting the relative humidity inside the agent storage space portion to 30-80% RH (preferably 40-70% RH, further preferably 40-60% RH), the released Chlorine dioxide concentration can be maintained high compared to when the relative humidity is less that 30%, even when some time had passed since the start of irradiation. Further, the reason that chlorine dioxide concentration is high in the beginning of irradiation even when the relative humidity is 20% is thought to be because moisture is contained to some extent in the agent itself before the start of irradiation.

Example 6

Investigation of Usefulness of Intermittent Irradiation

The chlorine dioxide generation unit described in FIG. 9 was employed to investigate the usefulness of intermittent irradiation of visible light in the present invention.

Conditions similar to Example 4 were employed for the agent stored in the agent storage space portion and the measurement of Chlorine dioxide concentration. Intermittent irradiation of visible light from the light source portion was carried out by alternating irradiation and stopping irradiation of visible light by switching the LED ON and OFF. Specifically, intermittent irradiation was carried out under the conditions of the following (1)-(3).
(1) Light was continuously irradiated for the first 2 minutes of irradiation, and after the first 2 minutes of irradiation, a cycle of irradiating light for 10 seconds (LED ON) and stopping irradiation for 80 seconds (LED OFF) was repeated.
(2) Light was continuously irradiated for the first 2 minutes of irradiation, and after the first 2 minutes of irradiation, a cycle of irradiating light for 20 seconds (LED ON) and stopping irradiation for 80 seconds (LED OFF) was repeated.
(3) Light was continuously irradiated for the first 2 minutes of irradiation, and after the first 2 minutes of irradiation, a cycle of irradiating light for 30 seconds (LED ON) and stopping irradiation for 80 seconds (LED OFF) was repeated.

The results of this test are shown in FIG. 16. Note that "Relative $ClO_2$ gas concentration" in the graph of FIG. 16 represents the relative value of chlorine dioxide concentration at each timepoint when chlorine dioxide concentration at two minutes from the start of irradiation was set as 1.

As shown in FIG. 16, in the present invention, chlorine dioxide at a desired concentration could be generated by intermittently irradiating visible light from the light source portion and adjusting the balance between irradiation time and stopped time in said intermittent irradiation.

Moreover, in the present invention, releasing of Chlorine dioxide at a relatively high concentration in the beginning of irradiation could be prevented by intermittently irradiating visible light from the light source portion. When irradiation of visible light is continued from the light source portion (i.e. when intermittent irradiation is not performed), e.g. the concentration of generated chlorine dioxide will be at the maximum in the beginning of irradiation and gradually decrease thereafter, as seen in the graph of FIG. 6. In other words, in the present invention, chlorine dioxide can be released more stably by intermittently irradiating visible light from the light source portion.

Further, needless to say, when visible light is intermittently irradiated from the light source portion, the consumption of the agent comprising solid chlorite which is the supply source of chlorine dioxide can be suppressed compared to when visible light is continuously irradiated from the light source portion. In other words, in the present invention, by employing a light source that can intermittently irradiate visible light, the usable time of the chlorine dioxide generation unit can be extended.

DESCRIPTION OF SYMBOLS

10 Chlorine dioxide generation unit
11 Agent storage space portion
12 LED chip
13 Operation circuit board
14 Agent
15 Tube
16 Openings
20 Chlorine dioxide generator
21 Chlorine dioxide generation unit
22 Apparatus body
23 Air supply port
24 Fan
25 Air exhaust port
30 Chlorine dioxide generation unit
31 Gas generation port
32 Agent storage space portion
33 Electron circuit board
34 LED chip
35 Outer casing portion
36 Air introduction port
40 Chlorine dioxide generator
41 LED chip mounted on circuit board
42 Agent storage space portion
43 Housing portion
44 Blower fan

The invention claimed is:
1. A chlorine dioxide generation unit comprising an agent storage space portion and at least two light source portions,
    wherein said at least two light source portions are for generating light consisting of wavelengths in a range of 360 nm to 830 nm,
    said agent storage space portion stores an agent comprising solid chlorite, and
    said agent storage space portion comprises one or more openings so that air can move in and out of said agent storage space portion,
    said agent storage space portion and said at least two light source portions are arranged so that said agent present inside said agent storage space portion is irradiated by the light generated from said at least two light source portions,
    wherein said agent comprises a porous substance supporting a chlorite and titanium dioxide, and the mass ratio of said chlorite to said titanium dioxide in said agent inside said agent storage space portion is 1:0.04-0.8, and
    wherein said agent comprises said titanium dioxide in an amount of 0.5 wt % to 9 wt %.
2. The chlorine dioxide generation unit according to claim 1, wherein said agent storage space portion and said at least two light source portions are integrally positioned, and said at least two light source portions irradiate light onto said agent from at least two directions.
3. The chlorine dioxide generation unit according to claim 1, wherein said irradiated light has a wavelength in a range of 360 nm-450 nm.
4. The chlorine dioxide generation unit according to claim 3, wherein said at least two light source portions comprise a lamp or a chip.
5. The chlorine dioxide generation unit according to claim 4, wherein said chip is an LED chip.

6. The chlorine dioxide generation unit according to claim 4, wherein said at least two light source portions are light source portions that can intermittently irradiate light.

7. The chlorine dioxide generation unit according to claim 1, wherein said porous substance supporting said chlorite is obtained by impregnating said porous substance with an aqueous chlorite solution and then drying said porous substance impregnated with said aqueous chlorite solution.

8. The chlorine dioxide generation unit according to claim 1, wherein
said porous substance is selected from the group consisting of sepiolite, palygorskite, montmorillonite, silica gel, diatomite, zeolite, and perlite, and
said chlorite is selected from the group consisting of sodium chlorite, potassium chlorite, lithium chlorite, calcium chlorite, and barium chlorite.

9. The chlorine dioxide generation unit according to claim 1, wherein said porous substance further supports an alkaline agent.

10. The chlorine dioxide generation unit according to claim 9, wherein said alkaline agent is selected from the group consisting of sodium hydroxide, potassium hydroxide, lithium hydroxide, sodium carbonate, potassium carbonate, and lithium carbonate.

11. The chlorine dioxide generation unit according to claim 9, wherein the molar ratio of said chlorite to said alkaline agent is 1:0.1-0.7.

12. The chlorine dioxide generation unit according to claim 9, wherein said porous substance supporting said chlorite and said alkaline agent is obtained by simultaneously or sequentially impregnating said porous substance with said chlorite and said alkaline agent and drying the porous substance supporting said chlorite and said alkaline agent.

13. A chlorine dioxide generator comprising the chlorine dioxide generation unit according to claim 1.

14. The chlorine dioxide generator according to claim 13, further comprising a blower portion for sending air to the agent stored inside said agent storage space portion in said chlorine dioxide generation unit.

15. The chlorine dioxide generator according to claim 14, wherein said blower portion is a fan for taking air from outside to inside of said chlorine dioxide generator or a fan for releasing air from inside to outside of said chlorine dioxide generator.

16. The chlorine dioxide generator according to claim 14, wherein
at least one opening of the one or more openings of said agent storage space portion is present on a side of said agent storage space portion, and
the air sent from said blower portion is at least partially sent to the agent via the at least one opening of the one or more openings present on the side of said agent storage space portion.

17. The chlorine dioxide generator according to claim 14, wherein the relative humidity inside said agent storage space portion is retained at 30-80% RH by air sent from said blower portion.

18. The chlorine dioxide generation unit according to claim 1, wherein said titanium dioxide is in powder form or granular form, and the porous substance is impregnated with the chlorite.

19. The chlorine dioxide generation unit according to claim 18, wherein said titanium dioxide is in powder form and has an average size in a range from 0.01 mm to 1 mm.

20. The chlorine dioxide generation unit according to claim 18, wherein said titanium dioxide is in granular form and has an average size in a range from 1 mm to 30 mm.

* * * * *

UNITED STATES PATENT AND TRADEMARK OFFICE
CERTIFICATE OF CORRECTION

Page 1 of 3

PATENT NO. : 10,239,032 B2
APPLICATION NO. : 15/106704
DATED : March 26, 2019
INVENTOR(S) : Takigawa et al.

It is certified that error appears in the above-identified patent and that said Letters Patent is hereby corrected as shown below:

In the Specification

Column 1, Line 13: Please correct "Chlorine" to read -- chlorine --

Column 1, Line 30: Please correct "Chlorine" to read -- chlorine --

Column 1, Line 43: Please correct "Chlorine" to read -- chlorine --

Column 2, Line 14: Please correct "Chlorite" to read -- chlorite --

Column 2, Line 18: Please correct "Chlorine" to read -- chlorine --

Column 2, Line 25: Please correct "Chlorine" to read -- chlorine --

Column 3, Line 25: Please correct "Characterized" to read -- characterized --

Column 3, Line 41: Please correct "Chlorine" to read -- chlorine --

Column 3, Line 42: Please correct "Characterized" to read -- characterized --

Column 3, Line 55: Please correct "Characterized" to read -- characterized --

Column 3, Line 56: Please correct "Chlorite" to read -- chlorite --

Column 3, Line 62: Please correct "Above" to read -- above --

Column 4, Line 1: Please correct "Chlorine" to read -- chlorine --

Column 4, Line 46: Please correct "Changing" to read -- changing --

Signed and Sealed this
Twentieth Day of August, 2019

Andrei Iancu
*Director of the United States Patent and Trademark Office*

CERTIFICATE OF CORRECTION (continued)
U.S. Pat. No. 10,239,032 B2

Column 4, Line 58: Please correct "Chlorite" to read -- chlorite --

Column 6, Line 29: Please correct "Chlorine" to read -- chlorine --

Column 8, Line 5: Please correct "Chlorite" to read -- chlorite --

Column 8, Line 7: Please correct "Chlorite" to read -- chlorite --

Column 8, Line 10: Please correct "Chlorite" to read -- chlorite --

Column 8, Line 11: Please correct "Chlorite" to read -- chlorite --

Column 8, Line 21: Please correct "Chlorite" to read -- chlorite --

Column 8, Line 27: Please correct "Chlorite" to read -- chlorite --

Column 8, Line 31: Please correct "Chlorite" to read -- chlorite --

Column 8, Line 36: Please correct "Chlorite" to read -- chlorite --

Column 9, Line 50: Please correct "Chlorite" to read -- chlorite --

Column 9, Line 53: Please correct "Chlorite" to read -- chlorite --

Column 9, Line 62: Please correct "Chlorine" to read -- chlorine --

Column 10, Line 9: Please correct "Chlorine" to read -- chlorine --

Column 10, Line 13: Please correct "Chlorine" to read -- chlorine --

Column 13, Line 7: Please correct "Chlorine" to read -- chlorine --

Column 13, Line 40: Please correct "Chlorine" to read -- chlorine --

Column 13, Line 59: Please correct "Chlorine" to read -- chlorine --

Column 13, Line 67: Please correct "(pgri)" to read -- (ppm) --

Column 14, Line 55: Please correct "Chlorine" to read -- chlorine --

Column 15, Line 52: Please correct "Change" to read -- change --

Column 15, Line 65: Please correct "Chlorine" to read -- chlorine --

Column 16, Line 5: Please correct "Chlorine" to read -- chlorine --

CERTIFICATE OF CORRECTION (continued)
U.S. Pat. No. 10,239,032 B2

Column 16, Line 45: Please correct "Chlorine" to read -- chlorine --

Column 16, Line 63: Please correct "Chlorine" to read -- chlorine --

Column 17, Line 15: Please correct "Chlorine" to read -- chlorine --

Column 17, Line 48: Please correct "Chlorine" to read -- chlorine --